Nov. 13, 1962 M. KESSLER 3,063,496

TELEPHONE BOOTH

Filed March 4, 1958 2 Sheets-Sheet 1

INVENTOR

MILTON KESSLER

BY Max L. Libman

ATTORNEY

INVENTOR
MILTON KESSLER
BY Max L. Libman
ATTORNEY

United States Patent Office 3,063,496
Patented Nov. 13, 1962

3,063,496
TELEPHONE BOOTH

Milton Kessler, 4535 Grove Drive, Youngstown, Ohio

Filed Mar. 4, 1958, Ser. No. 719,062
2 Claims. (Cl. 160—196)

This invention relates to the field of outdoor telephone booths and more particularly to a lightweight, rigidly assembled booth having walls of translucent plastic sheet material, and an improved door arrangement.

It is a primary object of the invention to provide a lightweight booth of readily available materials and inexpensive construction, which can be shipped assembled or disassembled and if shipped disassembled can be readily assembled by relatively unskilled workmen at or near the location where it is to be installed.

Another object is to provide a novel door arrangement in a telephone booth, which does not protrude into either the interior or the exterior of the booth while it is being opened, as with most present-day telephone booth doors, and yet operates easily to open and shut.

Still another object is to provide a lightweight booth which is nevertheless strong and rugged in construction and is wind-and-rainproof for outdoor use.

Another object is to provide a telephone booth which can be illuminated from within by the same light source which provides illumination to the user of the booth, to also shine through the translucent walls of the booth to attract attention thereto.

The specific nature of my invention as well as other objects and advantages thereof will clearly appear from a description of a preferred embodiment as shown in the accompanying drawings, in which.

The booth is constructed of a framework of metal structural members 2, preferably square or shaped like a square U-channel in cross-section for appearance and strength. Aluminum extrusions are preferred since they are light in weight and also strong, and require no paint for outdoor and indoor use. These extrusions are fastened together in any desired manner, as by welding or with nuts and bolts, to form the basic framework of the booth.

Figure 4:
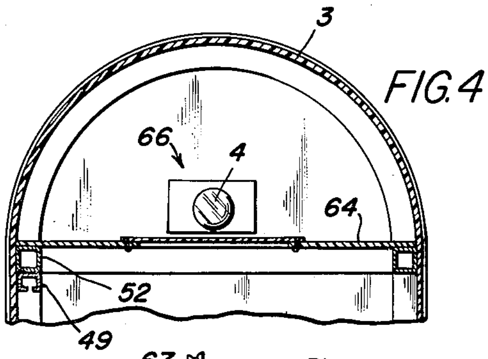
FIG. 4 is a sectional view taken on line 4—4 of FIG. 2.

The top of the booth 3 is formed of a single U-shaped sheet, preferably of glass fibers embedded in plastic, and known as Fiberglas panel. This can be provided in any desired color, and is fairly translucent, so that it shows up any printing on the outside, when illuminated from the interior. In this manner, by illuminating the interior, as by means of overhead light 4 (FIG. 4), the booth is rendered highly visible, even at night, from a considerable distance and from all sides, without the use of any special illuminated signs.

Figures 1, 2, 6, 7:
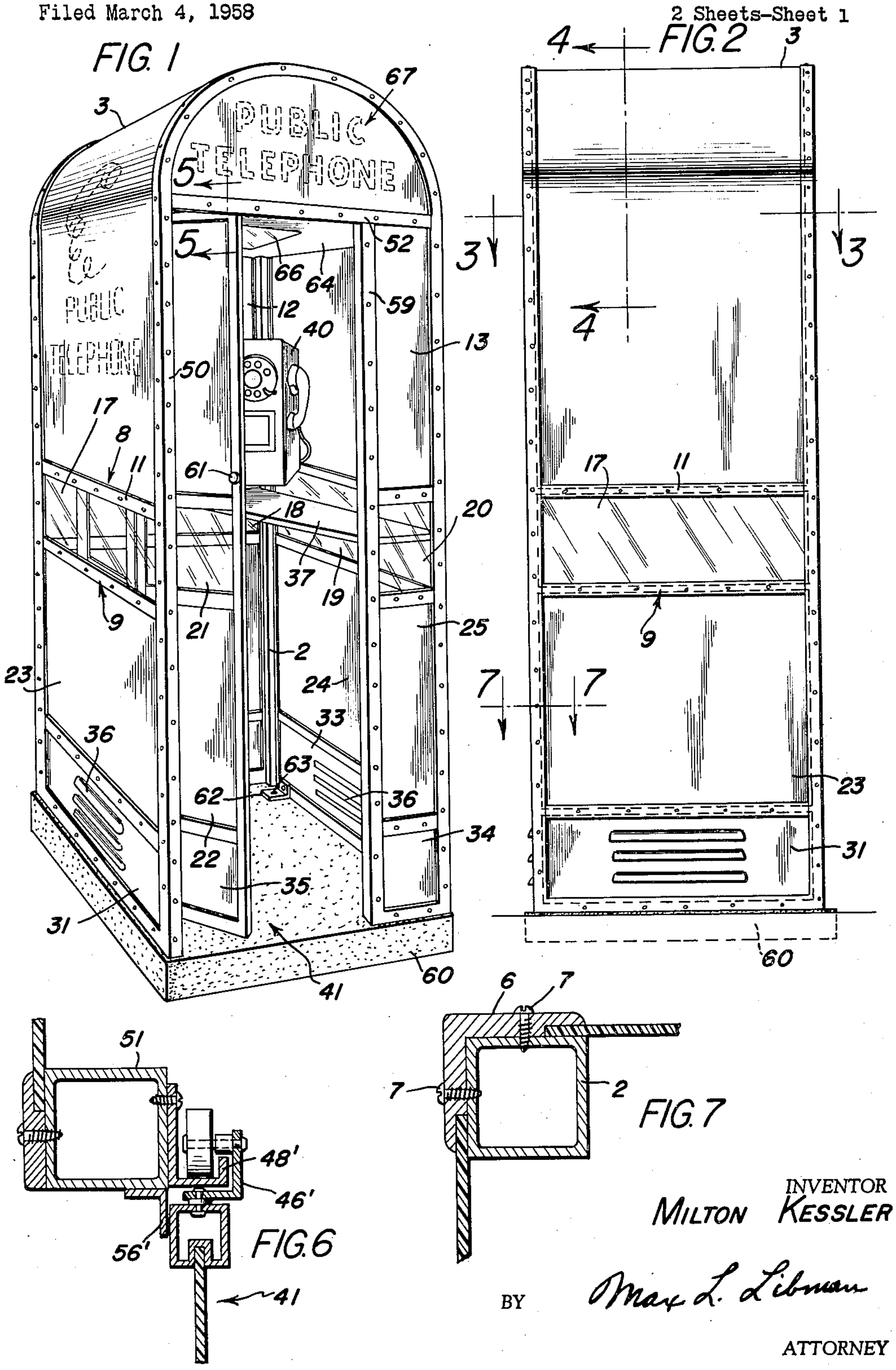
FIG. 1 is a perspective view of a telephone booth according to the invention.
FIG. 2 is a side view of the telephone booth of FIG 1.
FIG. 6 shows a modified form of door hanger and track.
FIG. 7 is a detail section taken on line 7—7 of FIG. 2.
Figure 3:
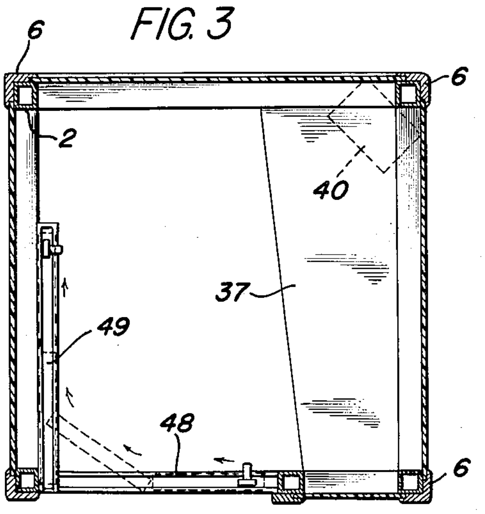
FIG. 3 is a sectional view of the booth taken on line 3—3 of FIG. 2.
Figure 5:
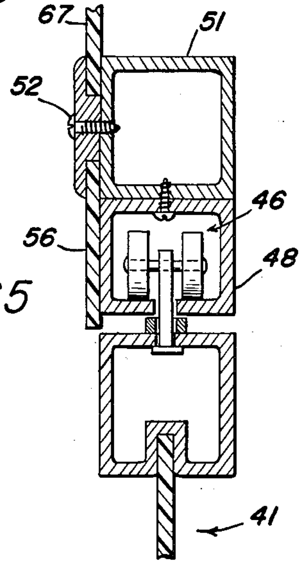
FIG. 5 is a detail sectional view of the door hanger and track, taken on line 6—6 of FIG. 1.

The panels which form the sides and top of the booth are fastened to the frame members 2 as shown in detail in FIGS. 3, 5 and 7. At the corners an exterior angle member 6 is fastened to the square frame member 2, preferably with sheet metal screws 7, so as to clamp the edge of the secured sheet, e.g., 3, between angle member 6 and frame member 2. At the cross-strips such as 8 and 9, a flat securing strap 11 is used, similar to that shown in FIG. 5 at 52.

The upper back wall panel 12 and front panel 13 are also preferably made of translucent plastic similar to member 3. Below these upper panels, a window strip is formed on all sides of the booth by clear panels 17, 18, 19, 20 and 21, to permit the occupancy of the booth to be visible from the exterior. Below the window strip, panels 22—25 are again of translucent fiber glass sheet material, and preferably darker in color than the upper panels, to show dirt less.

At the bottom, the booth is preferably provided with sheet metal panels 31—35, at least some of which are provided with louvers 36 for ventilation. A sheet metal shelf 37 is provided for writing, holding a telephone directory, etc., this may be fastened to the frame members 2 by screws or in any other desired manner. The telephone 40 may also be fastened to the frame member by means of a bracket, or may be fastened directly to panel 3, which is very strong, and can bear the weight of the telephone. The method of fastening the telephone in the booth is no part of the invention.

Where the booth is used outdoors, it is necessary to have a door 41. This is preferably made in two sections 42 and 43 hinged together by a piano hinge 44, although the door may also be made of one piece, or even of more than two sections if desired. Each upper outside corner of the door is supported by a roller wheel arrangement 46, 47 shown in detail in FIG. 6, pivotally fastened to the door. Roller 46 rides in a track 48 fastened to upper side frame member 51, while roller 47 rides in a track 49 fastened to upper front frame member 52.

FIG. 6 shows an alternative form of track and roller arrangement in which parts corresponding to those in FIG. 5 are identified by similar reference characters with a prime (′) added.

The door is opened by sliding it sideways, and as each roller rides in its track, the door moves from a position covering the aperture to a position substantially parallel to the side wall of the telephone booth. If the booth is occupied, especially by a large person, the hinged portion of the door allows it to bend appreciably away from the person, so as to retain the maximum amount of usable space within the booth. The door is closed by reversing the above-described operation. Preferably, the door is biased to close, so that when it is unoccupied it will not be opened to the weather. For this purpose, a spring or weight may be used, but it is preferred to bias the door toward closed position by sloping the tracks 48, 49 slightly so that the door tends to roll down them toward the closed position by gravity.

On the underside of front frame member 51 a door stop strip 56 may be fastened to improve both the appearance and weather-tightness of the door, and similar strips may be provided at the side frame members of the booth 50, 59 if desired. Alternatively, a channel member may be provided at the closing edge of the door frame, to accommodate this edge and render it impossible for wind or rain to blow the shut door inwardly.

Figure 8:
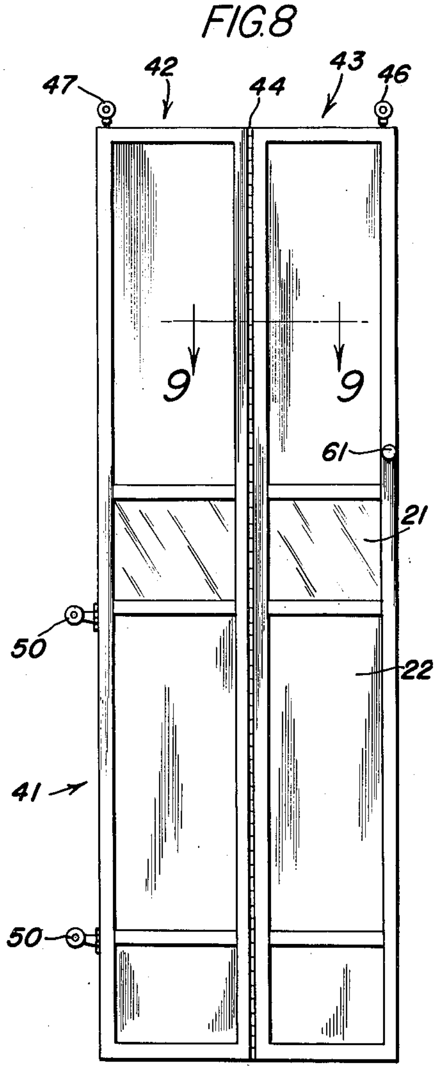
FIG. 8 is a front view of the door of the booth.
Figure 9:
FIG. 9 is a detail section taken on line 9—9 of FIG. 8.

If desired, for greater rigidity, further rollers 50 may be provided on the left side of the door, as seen in FIG. 8; these rollers may be hingedly attached to the door to provide the necessary swivel action, and will ride in suitable tracks attached to the cross-strips at 8 and 9 (FIG. 1) on the inside of the booth.

If desired, a bottom track and roller arrangement similar to that on the top of the door may also be provided so that the door rolls between two sets of rollers; however, for reasons of economy, it may be preferred to dispense with the bottom roller and track arrangement and utilize the weight of the door to keep it closed by hanging vertically.

A suitable handle or door knob 61 may be provided, but the relatively lightweight construction makes it also possible to manipulate the doors without them.

For outdoor use, the structure will normally be mounted on a prepared cement base 60, to which it may be fastened by brackets 62 and anchor bolts 63, or in any other desired fashion.

A ceiling panel 64 is preferably provided, which may be fastened to the upper frame members 51, 52, etc., and is provided with a center light fixture 66, preferably arranged so that illumination is also provided to the "attic" space above the ceiling, for greater visibility of the telephone booth and also to illuminate the sign 67 identifying the telephone booth.

Due to the strength and rigidity of the metal frame construction and to the inherent strength and toughness of the glass fibre-reinforced plastic sheets, the resulting structure is extremely rigid and strong, requires no painting or other maintenance, and will last indefinitely. It is also apparent that the structure can be shipped in disassembled condition, and can be readily assembled by unskilled workmen.

It will be apparent that the embodiments shown are only exemplary and that various modifications can be made in construction and arrangement within the scope of the invention as defined in the appended claims.

I claim:

1. A door and door mounting comprising a door with a suspension element substantially at each upper corner, each said suspension element bearing a roller wheel which is above the top edge of the door and substantially in the plane of the door, a generally horizontal straight track for one of said roller wheels to be mounted in the plane of the door when the door is open, a second generally horizontal straight track for the other of said roller wheels to be mounted perpendicularly to the first said track at the end away from the position of the roller wheel in the first said track when the door is closed, and so that the wheel in the second track is at the end of its track near the first said track, each said suspension element being pivotally mounted with respect to said door on a pivot axis lying substantially in the plane of said door, whereby as said wheels roll along their respective tracks, the door slides from a closed position to an open position that is perpendicular to said closed position.

2. The invention according to claim 1, said door being composed of two or more sections hinged together.

References Cited in the file of this patent

UNITED STATES PATENTS

| | | |
|---|---|---|
| 736,124 | Manter | Aug. 11, 1903 |
| 848,116 | Merritt | Mar. 26, 1907 |
| 1,211,790 | Van Orden | Jan. 9, 1917 |
| 1,442,942 | Gullicksen | Jan. 23, 1923 |
| 1,996,310 | Skoogh | Apr. 2, 1935 |
| 2,678,705 | Haines et al. | May 18, 1954 |
| 2,881,306 | Sherron | Apr. 17, 1959 |